(12) United States Patent
Luce

(10) Patent No.: US 9,651,181 B2
(45) Date of Patent: May 16, 2017

(54) HYDRAULIC HOSE GUIDE

(71) Applicant: Goodrich Corporation, Charlotte, NC (US)

(72) Inventor: William Luce, Colleyville, TX (US)

(73) Assignee: GOODRICH CORPORATION, Charlotte, NC (US)

(*) Notice: Subject to any disclaimer, the term of this patent is extended or adjusted under 35 U.S.C. 154(b) by 888 days.

(21) Appl. No.: 13/957,368

(22) Filed: Aug. 1, 2013

(65) Prior Publication Data
US 2015/0035271 A1    Feb. 5, 2015

(51) Int. Cl.
*F16L 35/00*    (2006.01)
*F16L 57/00*    (2006.01)

(52) U.S. Cl.
CPC ............ *F16L 35/00* (2013.01); *F16L 57/005* (2013.01)

(58) Field of Classification Search
CPC . F16L 3/003; F16L 3/10; F16L 3/1041; F16L 3/1091; F16L 57/005; F16L 35/00; F16L 55/005; F16L 2201/20; F16L 25/14
See application file for complete search history.

(56) References Cited

U.S. PATENT DOCUMENTS

| 1,844,023 | A |   | 2/1932  | Terry |
|-----------|---|---|---------|-------|
| 1,970,050 | A | * | 8/1934  | Mathey ................. F16L 33/221 285/114 |
| 2,295,830 | A |   | 9/1942  | Carlson |
| 5,853,200 | A | * | 12/1998 | Zieres .................... F16L 35/00 285/419 |
| 2012/0304447 | A1 | * | 12/2012 | Smith ..................... F16L 57/02 29/434 |

FOREIGN PATENT DOCUMENTS

| DE | 3619233 | 12/1986 |
| GB | 643615 | 9/1950 |
| GB | EP 0859182 A2 * | 8/1998 ........... E21B 17/017 |

OTHER PUBLICATIONS

Extended European Search Report dated Dec. 9, 2014 in European Application No. 14170817.2.

* cited by examiner

*Primary Examiner* — James M Hewitt
(74) *Attorney, Agent, or Firm* — Snell & Wilmer, L.L.P.

(57) ABSTRACT

The disclosed hose guide may prevent a hose from bending within a specified distance of a hose fitting, and therefore prevent weakening of the hose at the hose fitting interface. The hose guide may include a hose fitting stage, a straight hose stage, and a bell stage. The hose fitting stage may secure the hose guide around the hose fitting. The straight hose stage may prevent the hose from bending. The bell stage may allow the hose to bend at a radius greater than a minimum bend radius for the hose.

16 Claims, 6 Drawing Sheets

HYDRAULIC HOSE GUIDE

FIELD

The present disclosure relates to hydraulic hoses, and more particularly, to hydraulic hose fittings.

BACKGROUND

Hydraulic hoses have many applications. Hydraulic hoses may transmit hydraulic fluid under pressure to cause hydraulic machinery to perform work. Hydraulic hoses may be used instead of rigid pipes or tubes where flexibility is required or beneficial. The hydraulic hoses may have steel fittings swaged on the ends. The weakest part of the hydraulic hose may be at the connection between the hose and the steel fittings. In response to the hydraulic hose bending within a specified distance of the fittings, or bending at a radius less than a minimum bend radius, the hose may rupture or leak, causing the hydraulic system to fail.

SUMMARY

In various embodiments, a hose guide may comprise a straight section and a bell section. The straight section may comprise a plurality of hose fitting stages. Each hose fitting stage may have a different diameter. The bell section may comprise a curved inner profile. The curved inner profile may correspond to a minimum bend radius of a hose. The hose guide may further comprise a straight hose stage which prevents the hose from bending.

In various embodiments, a hose guide may comprise a first piece coupled to a second piece. The first piece and the second piece may define an inner cavity. The inner cavity may comprise a hose fitting stage, a straight hose stage, and a bell stage. A diameter of the bell stage may increase as a distance from the hose fitting stage increases.

In various embodiments, a hose attachment system may include a hose with a minimum bend radius, a fitting coupled to the hose, and a hose guide. The hose guide may comprise a hose fitting stage located around the fitting, a straight hose stage which prevents the hose from bending, and a bell stage. The bell stage may have an inner profile with a radius greater than or equal to the minimum bend radius of the hose.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
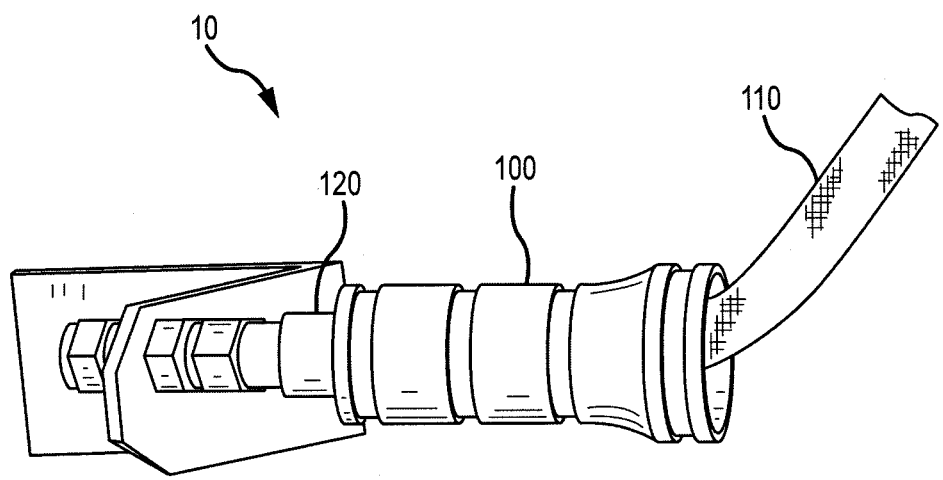
FIG. 1 illustrates, in accordance with various embodiments, a hose attachment system.

Referring to FIG. 1, a hose attachment system 10 is illustrated according to various embodiments. Hose attachment system 10 may comprise hose guide 100. Hose guide 100 may be coupled to hose 110. Hose 110 is coupled to hose fittings 120. In various embodiments, hose 110 may be a hydraulic hose. Manufacturer specifications for hose 110 may recommend that hose 110 not substantially bend within a defined distance of hose fittings 120. For example, in various embodiments, specifications may recommend that hose 110 remains substantially straight within one diameter of hose fittings 120. In other words, if hose 110 has a diameter of one inch, hose 110 must remain substantially straight within one inch of hose fittings 120. In various embodiments, hose 110 must remain substantially straight within one-half of the diameter of hose 110, or within two diameters of hose 110. In various embodiments, hose 110 may be defined as substantially straight if hose 110 bends less than one degree, or less than five degrees.

Figure 2:
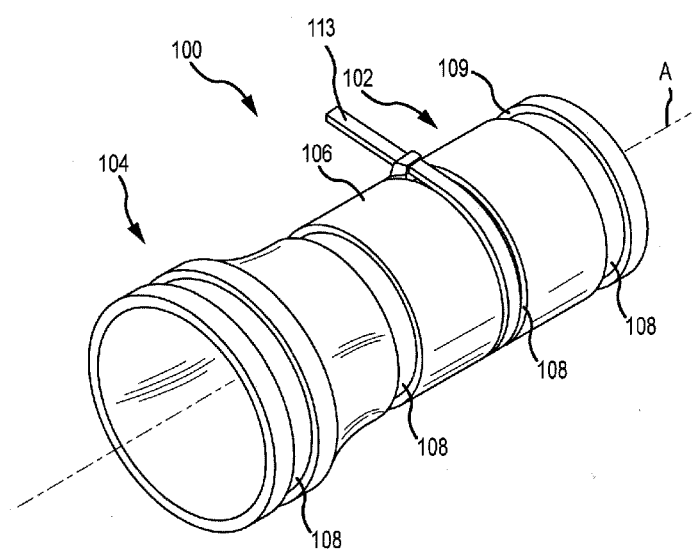
FIG. 2 illustrates, in accordance with various embodiments, a perspective view of a hose guide.

Referring to FIG. 2, a perspective view of a hose guide 100 is illustrated according to various embodiments. Hose guide 100 may comprise a straight section 102 and a bell section 104. Straight section 102 may be configured to keep a hose 110 substantially straight within straight section 102. In various embodiments, a radially outer outside diameter of outer surface 106 of hose guide 100 measured at straight section 102 may be of constant and/or substantially constant radius as one travels axially along axis A in straight section 102. In various embodiments, a radially outer outside diameter of outer surface 106 of hose guide 100 measured at bell section 104 may be of varying and/or variable radius as one travels axially along axis A in bell section 104. Bell section 104 may be configured to allow hose 110 to bend within the interior space of bell section 104. As illustrated, an outside diameter of hose guide 100 measured at bell section 104 may be larger than an outside diameter of hose guide 100 measured at straight section 102. However, in various embodiments, the outside diameter measured at bell section 104 may be substantially the same as the outside diameter measured at straight section 102, or the outside diameter measured at bell section 104 may be less than the outside diameter measured at straight section 102. The outside diameter measured at bell section 104 may vary as one travels axially along axis A in bell section 104. In various embodiments, the outside diameter at bell section 104 is larger than the outside diameter at straight section 102.

Hose guide 100 may further comprise one or more grooves 108 in an outer surface 106 of hose guide 100. Grooves 108 may be located in straight section 102, bell section 104, or in both straight section 102 and bell section 104. Fastening devices 113, such as wire ties or hose clamps, may be secured in grooves 108 in order to secure multiple pieces of hose guide 100 together. Groove walls 109 may prevent translational movement of fastening devices 113 when in place.

In various embodiments, hose guide 100 may comprise plastic. Hose guide 100 may be formed in a mold, such as an injection mold. However, hose guide 100 may comprise any material capable of preventing hose 110 from bending, such as steel, aluminum, carbon composites, copper, rubber, etc.

Figure 3:
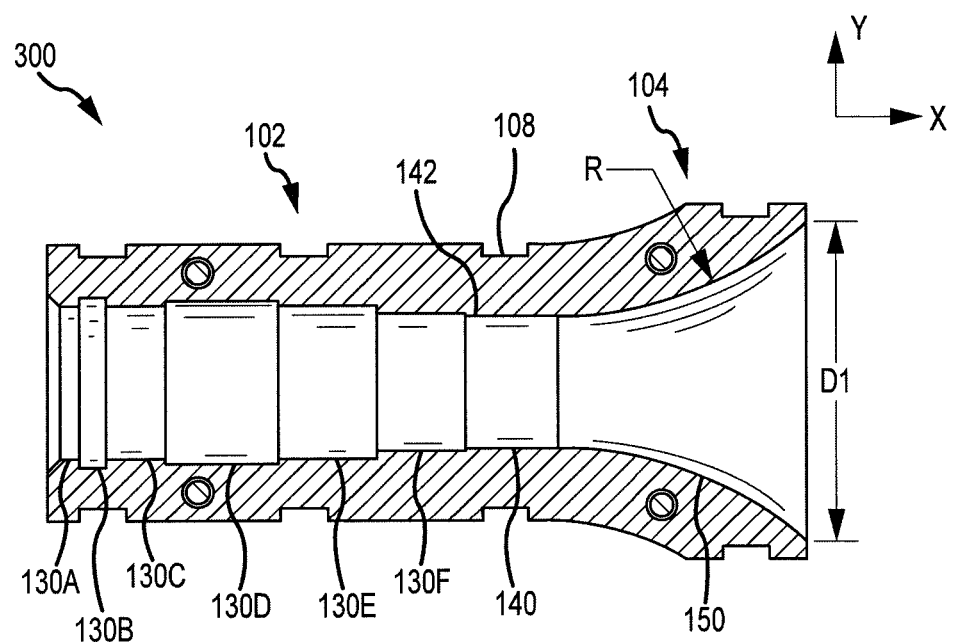
FIG. 3 illustrates, in accordance with various embodiments, a side view of a first piece of a hose guide.

Referring to FIG. 3, a side view of a first piece 300 of hose guide 100 is illustrated according to various embodiments. First piece 300 comprises straight section 102, bell section 104, and grooves 108. Hose guide 100 may comprise a plurality of hose fitting stages 130A, 130B, 130C, 130D, 130E, and 130F. Hose fitting stages 130A, 130B, 130C, 130D, 130E, and 130F may each have a different radially inner inside diameter. However, in various embodiments, two or more hose fitting stages 130A, 130B, 130C, 130D, 130E, and 130F may comprise substantially the same diameter. The specific number and size of hose fitting stages 130A, 130B, 130C, 130D, 130E, and 130F may vary based on the intended hose and fittings to be used with hose guide 100. For example, in various embodiments, hose guide 100 may comprise one hose fitting stage. However, in various embodiments, hose guide may comprise two, three, four, five, six, or more hose fitting stages.

Hose guide 100 may further comprise straight hose stage 140 directly coupled to bell section 104 and axially located between bell section 104 and hose fitting stage 130F. In straight hose stage 140, hose guide 100 may prevent bending of hose 110 axially located within straight hose stage 140. A length of straight hose stage 140 may be selected based on specifications for hose 110 describing a minimum distance from the hose fittings that hose 110 must remain substantially straight. For example, specifications may recommend that hose 110 remain substantially straight within one inch of hose fittings 120. Thus, straight hose stage 140 may be at least one inch long in such embodiments. In various embodiments, a diameter of straight hose stage 140 may be substantially equal to a diameter of hose 110. The diameter of straight hose stage 140 may be slightly greater than the diameter of hose 110, such as 1-2% greater or 5-10% greater, in order to ensure that hose guide 100 may fit around hose 110. An interior surface 142 of straight hose stage 140 may contact hose 110 to prevent hose 110 from bending when positioned in straight hose stage 140.

Hose guide 100 may further comprise bell stage 150. In bell stage 150, an inside diameter D1 of hose guide 100 may increase with an increase in the x-direction away from straight section 102. A profile of bell stage 150 may be curved with a radius R. Radius R may correspond to a minimum bend radius for hose 110. Thus, bell stage 150 may allow hose 110 to bend, but may prevent hose 110 from bending at a radius less than radius R.

Figure 4A:
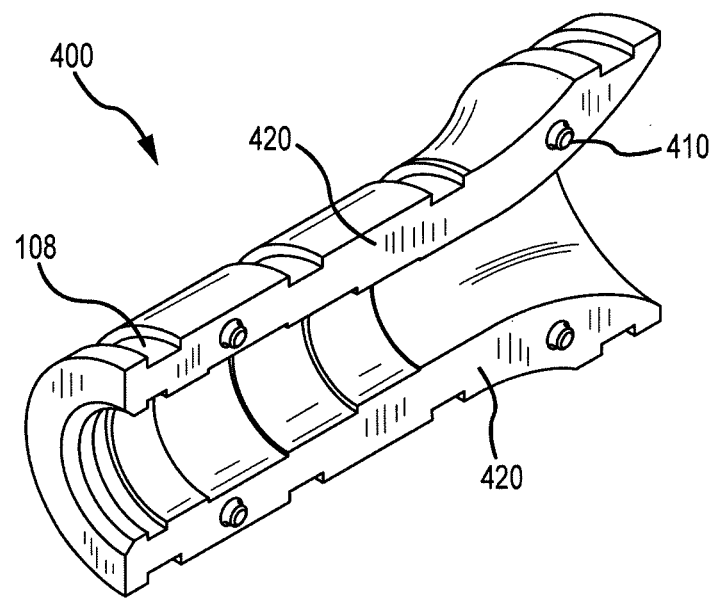
FIGS. 4A-4B illustrate, in accordance with various embodiments, a perspective view of a first piece and a second piece of a hose guide.
Figure 4B:
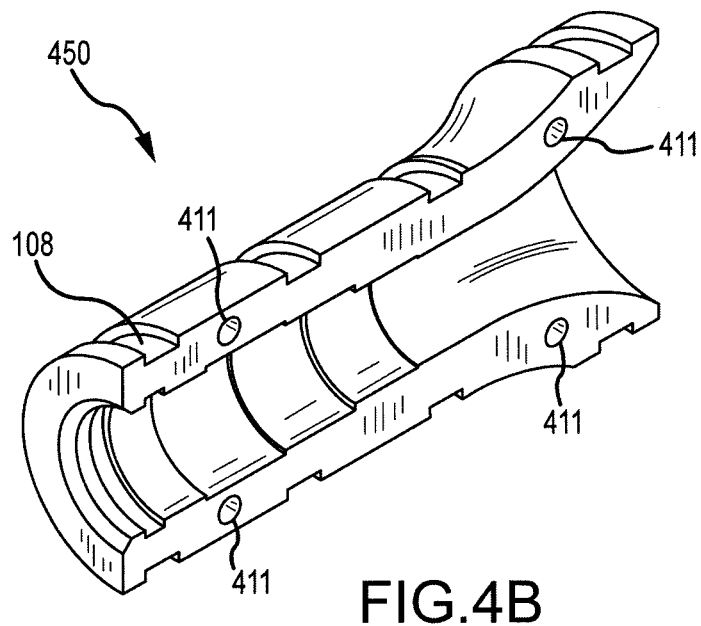

Referring to FIGS. 4A and 4B, a first piece 400 and second piece 450 of hose guide 100 is illustrated according to various embodiments. In various embodiments, hose guide 100 may comprise a two-piece construction. However, in various embodiments, hose guide 100 may comprise a single piece, or three or more pieces. In various embodiments, hose guide 100 may comprise a single piece which may be formed around a hose at the time that fittings are attached to the hose. First piece 400 may comprise alignment pegs 410. Alignment pegs 410 may extend from mating surfaces 420 of first piece 400. Alignment pegs 410 may be configured to align with alignment holes 411 on second piece 450. Alignment pegs 410 may be inserted into alignment holes 411, thus aligning first piece 400 with second piece 450. Fasteners may be placed in grooves 108 to secure first piece 400 to second piece 450. However, in various embodiments, first piece 400 may be secured to second piece 450 using screws, bolts, snaps, clips, an adhesive, or any other method for coupling first piece 400 to second piece 450. First piece 400 and second piece 450 may be coupled together around hose 110 and hose fittings 120. First piece 400 and second piece 450 may mate together to form an inner cavity. The inner cavity may comprise hose fitting stages 130A through 130F, straight hose stage 140, and bell stage 150 as described with reference to FIG. 3.

Figure 5:
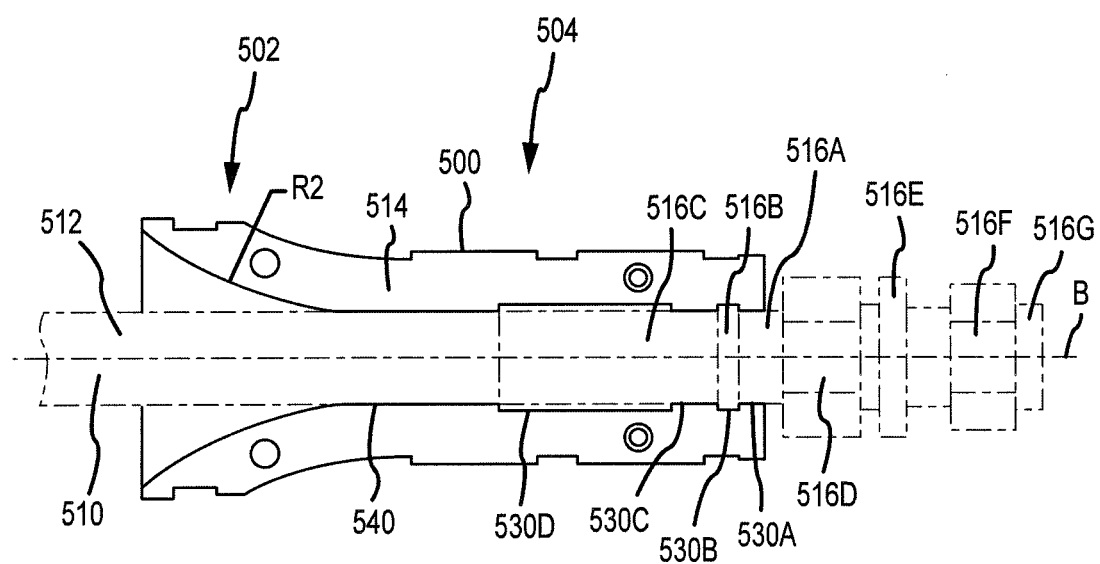
FIG. 5 illustrates a hose in a piece of a hose guide.

Referring to FIG. 5, a hose 510 is illustrated located within a first piece 500 of a hose guide. First piece 500 may comprise bell section 502, and straight section 504. First piece 500 may further comprise hose fitting stages 530A, 530B, 530C, and 530D. In the illustrated embodiment, first piece 500 comprises four hose fitting stages. However, as previously described, in various embodiments first piece 500 may comprise any number of hose fitting stages. First piece 500 may further comprise straight hose stage 540 directly coupled to bell section 502 and axially located between bell section 502 and hose fitting stage 530D.

Hose 510 may comprise free section 512, constrained section 514, and fittings 516A, 516B, 516C, 516D, 516E, 516F, and 516G. Free section 512 may be permitted to bend within bell section 502. However, bell section 502 may prevent free section 512 from bending at a radius less than a radius R2 of bell section 502. Straight section 504 may prevent constrained section 514 from substantially bending. Thus, straight section 504 may prevent damage to hose 510 at constrained section 514, where hose 510 may be susceptible to damage from bending. Hose fittings 516A, 516B, 516C, 516D, 516E, 516F, and 516G may comprise any type of hose fittings which may be attached to a hose. In various embodiments, hose fittings 516A, 516B, 516C, 516D, 516E, 516F, and 516G may be swaged onto hose 510. In various embodiments, at least one of hose fittings 516A, 516B, 516C, 516D, 516E, 516F, and 516G may be located within first piece 500, and at least one of hose fittings 516A, 516B, 516C, 516D, 516E, 516F, and 516G may be located axially exterior of first piece 500. Hose fitting 516A may be located in hose fitting stage 530A, hose fitting 516B may be located in hose fitting stage 530B, and hose fitting 516C may be located in hose fitting stages 530C and 530D. Hose fitting stages 530A, 530B, 530C, and 530D may be designed such that first piece 500 may accommodate a plurality of hose fitting types. In various embodiments, different diameters of the various hose fitting stages 530A, 530B, 530C, and 530D may prevent translational movement along axis B of hose 510 within first piece 500. For example, hose fitting stages 530A and 530C may have a diameter less than hose fitting stage 530B and hose fitting 516B. Thus, hose fitting stages 530A and 530C may contact hose fitting 516B and prevent translational movement of hose 510 within first piece 500.

Figure 6:
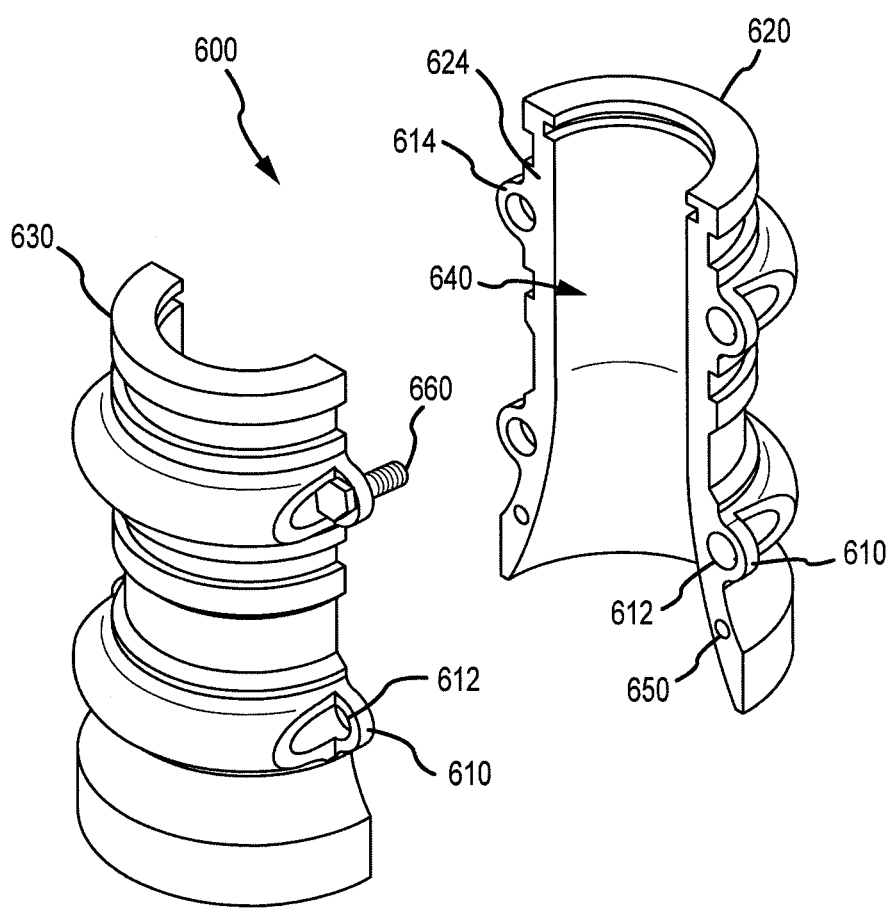
FIG. 6 illustrates, in accordance with various embodiments, a perspective view of a first piece and a second piece of a hose guide with bolt lugs.

Referring to FIG. 6, a perspective view of a hose guide 600 with fastening members such as bolt lugs 610 is illustrated according to various embodiments. Hose guide 600 may comprise first piece 620 and second piece 630. An interior section 640 may be similar to that of hose guide 100, as described with reference to FIG. 3. In various embodiments, bolt lugs 610 may be coupled to first piece 620 and second piece 630. In various embodiments, bolt lugs 610 may be integrally formed with first piece 620 and second piece 630. In various embodiments, bolt lug mating surfaces 614 may be flush with first piece mating surfaces 624. In various embodiments, first piece 620 may further comprise alignment holes 650, which may align with corresponding alignment pegs on second piece 630 in order to assist with aligning first piece 620 and second piece 630.

In various embodiments, bolt lugs 610 may define bolt holes 612. A fastening device such as a bolt 660 may be inserted through a bolt hole 612 on first piece 620 and through a corresponding bolt hole 612 on second piece 630. Thus, first piece 620 and second piece 630 may be coupled around a hose using bolts. In various embodiments, additional fastening devices, such as zip ties or wires may be used to couple first piece 620 to second piece 630.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hose guide comprising:
a straight section comprising a straight hose stage, a first hose fitting stage, a second hose fitting stage, a third hose fitting stage, a fourth hose fitting stage, a fifth hose fitting stage, and a sixth hose fitting stage,
wherein the sixth fitting stage has a larger inner diameter than the straight hose stage adjacent thereto, the fifth fitting stage has a larger inner diameter than the sixth fitting stage adjacent thereto, the fourth fitting stage has a larger inner diameter than the fifth fitting stage adjacent thereto, the third fitting stage has a smaller inner diameter than the fourth fitting stage adjacent thereto, the second fitting stage has a larger inner diameter than the third fitting stage adjacent thereto, and the first fitting stage has a smaller inner diameter than the second fitting stage adjacent thereto; and
a bell section directly coupled to and axially aligned with the straight section, a cross-section of the bell section comprising a curved inner profile extending for a full length of the bell section in an axial direction from the straight hose stage to an opening of the bell section, wherein the straight hose stage is configured to prevent a hose from bending within the straight hose stage, wherein the curved inner profile comprises a radius configured to prevent the hose from bending at a radius less than a minimum bend radius of the hose.

2. The hose guide of claim 1, further comprising one or more grooves in an outer surface of the hose guide.

3. The hose guide of claim 2, further comprising one or more fasteners located in the one or more grooves.

4. The hose guide of claim 1, wherein the hose guide comprises a first piece including a first fastening member, and a second piece including a second fastening member, and wherein the first piece and the second piece are configured to be coupled together with a fastening device coupling the first and second fastening members.

5. The hose guide of claim 1, further comprising a first piece and a second piece, wherein one or more fasteners couple the first piece to the second piece.

6. The hose guide of claim 5, wherein the first piece comprises an alignment peg.

7. The hose guide of claim 6, wherein the alignment peg is located within an alignment hole in the second piece.

8. The hose guide of claim 1, wherein an outside diameter of the bell section is greater than an outside diameter of the straight section.

9. A hose guide comprising:
a first piece; and
a second piece coupled to the first piece, wherein the first piece and the second piece form an inner cavity comprising a straight hose stage, a bell stage, a first hose fitting stage, a second hose fitting stage, a third hose fitting stage, a fourth hose fitting stage, a fifth hose fitting stage, and a sixth hose fitting stage, wherein the sixth fitting stage has a larger inner diameter than the straight hose stage adjacent thereto, the fifth fitting stage has a larger inner diameter than the sixth fitting stage adjacent thereto, the fourth fitting stage has a larger inner diameter than the fifth fitting stage adjacent thereto, the third fitting stage has a smaller inner diameter than the fourth fitting stage adjacent thereto, the second fitting stage has a larger inner diameter than the third fitting stage adjacent thereto, and the first fitting stage has a smaller inner diameter than the second fitting stage adjacent thereto;

wherein a cross-section of the bell stage comprises a curved inner profile extending for a full length of the bell section in an axial direction from the straight hose stage to an opening of the bell stage, wherein the straight hose stage is configured to prevent a hose from bending within the straight hose stage, wherein the curved inner profile comprises a radius configured to prevent the hose from bending at a radius less than a minimum bend radius of the hose.

10. The hose guide of claim 9, wherein an inside diameter of the bell stage increases as a distance from the straight hose stage increases.

11. The hose guide of claim 9, further comprising a fastener located in a groove in the first piece and the second piece.

12. The hose guide of claim 9, wherein the first piece comprises an alignment peg located within an alignment hole in the second piece.

13. The hose guide of claim 9, wherein the radius of the curved inner profile of the bell stage is configured to protect a free portion of the hose from bending at a radius less than the radius of the curved inner profile of the bell stage.

14. A hose attachment system comprising:
a hose with a minimum bend radius;
a fitting coupled to the hose; and
a hose guide comprising:
  a first hose fitting stage, a second hose fitting stage, a third hose fitting stage, a fourth hose fitting stage, a fifth hose fitting stage, and a sixth hose fitting stage, all located around the fitting,
  wherein the sixth fitting stage has a larger inner diameter than the straight hose stage adjacent thereto, the fifth fitting stage has a larger inner diameter than the sixth fitting stage adjacent thereto, the fourth fitting stage has a larger inner diameter than the fifth fitting stage adjacent thereto, the third fitting stage has a smaller inner diameter than the fourth fitting stage adjacent thereto, the second fitting stage has a larger inner diameter than the third fitting stage adjacent thereto, and the first fitting stage has a smaller inner diameter than the second fitting stage adjacent thereto;
  a straight hose stage configured to prevent the hose from bending; and
  a bell stage, wherein the bell stage comprises a cross-section comprising a curved inner profile extending for a full length of the bell section in an axial direction from the straight hose stage to an opening of the bell stage, the inner profile having a radius greater than or equal to the minimum bend radius.

15. The hose attachment system of claim 14, further comprising a fastener located in a groove in an outer surface of the hose guide.

16. The hose attachment system of claim 14, wherein the hose guide comprises a first piece and a second piece coupled around the hose and the fitting.

* * * * *